(12) United States Patent
Serrano et al.

(10) Patent No.: US 8,246,852 B2
(45) Date of Patent: Aug. 21, 2012

(54) REFRIGERANT COMPOSITION

(75) Inventors: Myrna Serrano, Midland, MI (US);
John W. Sherman, Houston, TX (US);
Oscar D. Redwine, Coleman, MI (US);
Aaron W. Sanders, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/111,389

(22) Filed: May 19, 2011

(65) Prior Publication Data

US 2011/0272624 A1 Nov. 10, 2011

Related U.S. Application Data

(63) Continuation-in-part of application No. 12/417,944, filed on Apr. 3, 2009, now Pat. No. 8,003,003.

(60) Provisional application No. 61/042,392, filed on Apr. 4, 2008.

(51) Int. Cl.
*C09K 5/04* (2006.01)

(52) U.S. Cl. ......................................................... 252/68

(58) Field of Classification Search ...................... 252/68
See application file for complete search history.

(56) References Cited

U.S. PATENT DOCUMENTS

| | | | |
|---|---|---|---|
| 4,755,316 A | 7/1988 | Magid et al. | |
| 4,851,144 A | 7/1989 | McGraw et al. | |
| 5,152,926 A | 10/1992 | Brown | |
| 5,370,812 A | 12/1994 | Brown | |
| 5,384,057 A | 1/1995 | Wilczek | |
| 5,595,678 A | 1/1997 | Short et al. | |
| 5,976,399 A | 11/1999 | Schnur | |
| 6,299,792 B1 | 10/2001 | Feiring et al. | |
| 6,467,279 B1 * | 10/2002 | Backman et al. | 62/79 |
| 6,475,405 B1 | 11/2002 | Kawaguchi et al. | |
| 7,018,558 B2 | 3/2006 | Schnur et al. | |
| 7,279,451 B2 | 10/2007 | Singh et al. | |
| 7,560,045 B2 | 7/2009 | Brown et al. | |
| 7,628,933 B2 | 12/2009 | Short | |
| 2001/0019120 A1 | 9/2001 | Schnur et al. | |
| 2006/0022166 A1 | 2/2006 | Wilson et al. | |
| 2006/0116310 A1 | 6/2006 | Singh et al. | |
| 2007/0040147 A1 | 2/2007 | Brown et al. | |
| 2007/0108403 A1 | 5/2007 | Sievert et al. | |
| 2007/0187639 A1 | 8/2007 | Leck et al. | |
| 2007/0284078 A1 | 12/2007 | Leck et al. | |
| 2007/0284555 A1 | 12/2007 | Leck et al. | |
| 2007/0289317 A1 | 12/2007 | Minor et al. | |
| 2007/0290164 A1 | 12/2007 | Kaneko | |
| 2008/0026977 A1 * | 1/2008 | Thomas et al. | 510/412 |

FOREIGN PATENT DOCUMENTS

| | | |
|---|---|---|
| WO | 95/12649 A1 | 5/1995 |
| WO | 2006/069362 A2 | 6/2006 |
| WO | 2007/126760 A2 | 11/2007 |
| WO | 2008/027595 A1 | 3/2008 |

OTHER PUBLICATIONS

International Preliminary Report on Patentability for copending patent application PCT/US2009/039423 dated Oct. 14, 2010.
International Search Report and the Written Opinion of the International Searching Authority for copending patent application PCT/US2009/0397423 dated Nov. 16, 2009.
Class II Ozone-depleting Substances, United States Environmental Protection Agency, updated Oct. 24, 2007, as accessed at www.epa.gov/ozone/science/ods/classtwo.html on Mar. 24 2008.
Global Warming Potentials of ODS Substitutes, United States Environmental Protection Agency updated Oct. 4, 2007 as accessed at www.epa.gov/ozone/geninfo/gwps.html, on Mar. 24, 2008.
United States Code: 42 U.S.C. §7671, Definitions, Mar. 24, 2008.

* cited by examiner

*Primary Examiner* — John Hardee

(57) ABSTRACT

An improved refrigerant composition, or a kit for an improved refrigerant composition, for use in air conditioners comprising a refrigerant, wherein the refrigerant comprises a hydrofluorocarbon having a GWP of less than about 10 and an ODP of about zero, which is present at a concentration of at least about 50% by weight of the refrigerant composition; a lubricant wherein the lubricant is a polar, oxygenated lubricant; and an acid scavenger comprising a siloxane, an activated aromatic compound, or any mixtures thereof.

9 Claims, No Drawings

REFRIGERANT COMPOSITION

The present application is a continuation in part of U.S. Provisional application No. 12/417,944 filed on Apr. 3, 2009 now U.S. Pat. No. 8,003,003 which is a non-provisional application of U.S. Provisional Patent Application No. 61/042,392 filed on Apr. 4, 2008. The present application claims the benefit of the filing date of U.S. patent application Ser. No. 12/417,944 filed on Apr. 3, 2009 and U.S. Provisional Patent Application No. 61/042,392 ("REFRIGERANT COMPOSITION" filed Apr. 4, 2008 by Serrano et al.), the contents of which are both hereby incorporated by reference in their entirety.

FIELD OF THE INVENTION

This invention relates to an improved composition for use in devices that provide cooling or refrigeration.

BACKGROUND OF THE INVENTION

In a response to environmental concerns and new regulations on refrigerant compositions used in the refrigeration and air conditioning industry, new refrigerant compositions are being developed. The environmental friendliness of refrigerants is often characterized by one or both of a criteria known as "global warming potential" (GWP), or a criteria known as "ozone depletion potential" (ODP).

The GWP value is a number established by the Intergovernmental Panel on Climate Change (IPCC) that refers to the amount of global warming caused by a substance. The ODP value is a number defined by the United States Environmental Protection Agency that refers to the amount of ozone depletion caused by a substance as compared to chlorofluorocarbon-11 (CFC0911, chemically known as trichlorofluoromethane), as given in 42 U.S.C. 7671, "(10) Ozone-Depletion Potential", incorporated by reference.

By way of illustration of the progress made thus far, the quest for more environmentally friendly refrigerants was pursued in earnest in the 1980's in response to theories about the depletion of atmospheric ozone due in part to refrigerants such as R-12 (dichlorodifluoromethane), which has a GWP of about 1600 and an ODP of 1. In the 1990's, refrigerants having lower ozone depletion potential, such as R-134a (1,1,1,2-Tetrafluoroethane, also called tetrafluoroethane), were introduced. R-134a has an ODP of zero, but still has a GWP of about 1200.

In many cases, a new refrigerant material, besides having low impact on the environment, should also have one or more of the following characteristics: capability of functioning in many existing refrigerant systems, relatively low flammability, relatively low toxicity, have minimal or no reaction (e.g. corrosion) with aluminum, copper and iron at temperatures below 175° C., or good thermal stability as tested using ANSI ASHRAE 97.

Leck et al. (WO 2007/126760) teaches the use of stabilizers including silanes in compositions containing an iodotrifluoromethane refrigerant. Mouli et al. (WO 2008/027595) teaches the use of alkyl silanes as a stabilizer in refrigerant compositions containing fluoroolefins. Phosphates, phosphites, epoxides, and phenolic additives also have been employed in certain refrigerant compositions. These are described for example by Kaneko (U.S. patent application Ser. No. 11/575,256, published as 20070290164) and Singh et al. (U.S. patent application Ser. No. 11/250,219, published as 20060116310). All of these forementioned applications are expressly incorporated herein by reference.

Certain compositions (see for example Leck et al. U.S. patent application Ser. No. 11/653,125 Publication No. 2007/0187639, paragraph 10, hereby incorporated by reference) having a low ozone depletion potential and a low GWP have been proposed for use in a refrigerant composition.

Polymeric materials such as a fluoralkyl polysiloxane (see for example Kawaguchi et al. U.S. Pat. No. 6,475,405, column 9, line 13) have been proposed or used as an anti-load additive in a refrigerant composition.

Polysiloxane polyoxyalkylene block copolymers have been used as a surfactant with fluorocarbon foam blowing agents by Singh et al. (WO 2006/069362) who teach foaming of polymers using the fluorocarbon/surfactant composition.

There are continuing efforts to develop improved refrigerant compositions having improved properties such as relatively low environmental impact, relatively good compatibility, relatively low corrosivity to metals, relatively low cost, relatively low acid number, any combination thereof, and the like. Improvements in one or more property of the refrigerant composition typically negatively affect one or more different properties.

Accordingly there is a need for a robust acid scavenger for use in refrigerant compositions that can economically and efficiently provide one, two, three or more improved properties. In particular, there continues to exist a need for improved acid scavengers in refrigerant compositions having a low global warming potential, a low ozone depletion potential, or both.

SUMMARY OF THE INVENTION

Through its various aspects the present invention meets some or all of the above needs by providing in one broad aspect an improved refrigerant composition for use in air conditioners comprising: a refrigerant, wherein the refrigerant comprises a fluorocarbon which is present at a concentration of at least about 50% by weight of the refrigerant composition; a lubricant which reduces the wear of one or more working parts in a refrigerant system; and an acid scavenger comprising a siloxane, an activated aromatic compound, or any mixtures thereof.

Aspects of the present invention are also directed at a kit for a refrigerant composition comprising a refrigerant component including a fluorocarbon, having a GWP of less than about 10 and an ODP of about zero; and a lubricant component comprising a for reducing the wear of one or more working parts in a refrigerant composition. The kit further comprises an acid scavenger wherein the acid scavenger comprises a siloxane, an activated aromatic compound or any mixtures thereof. The refrigerant component includes the acid scavenger; the lubricant component includes the acid scavenger; the kit further comprises an acid scavenger component that includes the acid scavenger; or any combination thereof.

Among the many applications for which the above compositions may be employed are cooling applications for transportation vehicles, for buildings, and for fluid cooling.

The overall resulting refrigerant composition advantageously has relatively low corrosivity, such that a metal (e.g., aluminum, copper, or iron) part of a refrigerant system in contact with the composition experiences relatively low corrosion. The relatively low corrosivity of the refrigerant composition may be such that the refrigerant composition advantageously exhibits one or any combination of the following properties: a total acid number after aging less than 3.3 mg KOH/g (as measured per ASTM D664-01 after aging per ANSI ASHRAE 97 for 14 days at 175° C. with aluminum, copper and iron metal strips); a total halides concentration (e.g., a fluorine ion concentration) of less than about 240 ppm after aging per ANSI ASHRAE 97 for 14 days at 175° C. with aluminum, copper and iron metal strips, as measured by ion chromatography; or a total organic acid concentration of less than about 600 ppm after aging per ANSI ASHRAE 97 for 14 days at 175° C. with aluminum, copper and iron metal strips, as measured by ion chromatography.

DETAILED DESCRIPTION OF THE INVENTION

The present invention includes improved compositions, methods and systems for cooling and/or refrigeration. The compositions and methods may be used in stationary or mobile systems for producing cooling. For example, the compositions and methods may be used in air conditioning systems for commercial, industrial or residential buildings. The compositions and methods may also be used in refrigerators or freezers (stationary and mobile), whether commercial, industrial or residential. The present inventions find their preferred application in auto vehicles (e.g., vehicle air conditioning systems) or other portable cooling systems.

The invention includes circulating a refrigerant composition that includes at least one refrigerant and at least one lubricant through a refrigeration device. The refrigeration device may include a compressor, a condenser and an evaporator, with a liquid refrigerant line containing an expansion device such as a capillary tube, orifice or thermal expansion valve between the condenser and evaporator. In operation, the compressor compresses the refrigerant vapors, which then condense to the liquid state in the condenser and pass through the liquid line and expansion device into the evaporator. The refrigerant vaporizes in the evaporator, thereby absorbing its latent heat of evaporation from the surrounding environment, which provides the cooling.

The invention is predicated on the unexpected performance of refrigerant compositions that include a stabilizer, such as an acid scavenger, that includes a siloxane, an activated aromatic compound, or a combination thereof. The acid scavenger may be advantageously employed in improved refrigerant compositions having relatively good stability, relatively low ozone depletion potential, relatively low global warming potential, or any combination thereof.

Suitable refrigerants herein are compounds or mixture of compounds that function as a heat transfer fluid in a cycle wherein the fluid undergoes a phase change from a liquid to a gas and back. A preferred refrigerant of the present invention is a fluorocarbon which comprise carbon atoms, fluorine atoms and optionally hydrogen atoms. In one aspect of the invention, the fluorocarbon may contain only carbon, fluorine and optionally hydrogen atoms, and preferably contain from about 3 to about 12 carbon atoms, more preferably from about 3 to about 7 carbon atoms. Preferred fluorocarbons include fluoroalkanes, fluoroolefins, or a mixture thereof. In one preferred aspect, it may be desirable for the fluorocarbon to be essentially free of iodine atoms or even totally free of iodine atoms.

Leck et al. (US Patent Application Publication No. 2007/0187639, paragraph 10, hereby incorporated by reference) further lists examples of unsaturated fluorocarbon refrigerants which may be used as the fluoroolefins in the present invention.

As set forth in paragraph 10 of Leck et al., representative unsaturated fluorocarbon refrigerants or heat storage fluids include 1,2,3,3,3-pentafluoro-1-propene, 1,1,3,3,3-pentafluoro-1-propene, 1,1,2,3,3-pentafluoro-1-propene, 1,2,3,3-tetrafluoro-1-propene, 2,3,3,3-tetrafluoro-1-propene, 1,3,3,3-tetrafluoro-1-propene, 1,1,2,3-tetrafluoro-1-propene, 1,1,3,3-tetrafluoro-1-propene, 1,2,3,3-tetrafluoro-1-propene, 2,3,3-trifluoro-1-propene, 3,3,3-trifluoro-1-propene, 1,1,2-trifluoro-1-propene, 1,1,3-trifluoro-1-propene, 1,2,3-trifluoro-1-propene, 1,3,3-trifluoro-1-propene, 1,1,1,2,3,4,4,4-octafluoro-2-butene, 1,1,2,3,3,4,4,4-octafluoro-1-butene, 1,1,1,2,4,4,4-heptafluoro-2-butene, 1,2,3,3,4,4,4-heptafluoro-1-butene, 1,1,1,2,3,4,4-heptafluoro-2-butene, 1,3,3,3-tetrafluoro-2-(trifluoromethyl)-2-propene, 1,1,3,3,4,4,4-heptafluoro-1-butene, 1,1,2,3,4,4,4-heptafluoro-1-butene, 1,1,2,3,3,4,4-heptafluoro-1-butene, 2,3,3,4,4,4-hexafluoro-1-butene, 1,1,1,4,4,4-hexafluoro-2-butene, 1,3,3,4,4,4-hexafluoro-1-butene, 1,2,3,4,4,4-hexafluoro-1-butene, 1,2,3,3,4,4-hexafluoro-1-butene 1,1,2,3,4,4-hexafluoro-2-butene, 1,1,1,2,3,4-hexafluoro-2-butene, 1,1,1,2,3,3-hexafluoro-2-butene, 1,1,1,3,4,4-hexafluoro-2-butene, 1,1,2,3,3,4-hexafluoro-1-butene, 1,1,2,3,4,4-hexafluoro-1-butene, 3,3,3-trifluoro-2-(trifluoromethyl)-1-propene, 1,1,1,2,4-pentafluoro-2-butene, 1,1,1,3,4-pentafluoro-2-butene, 3,3,4,4,4-pentafluoro-1-butene, 1,1,1,4,4-pentafluoro-2-butene, 1,1,1,2,3-pentafluoro-2-butene, 2,3,3,4,4-pentafluoro-1-butene, 1,1,2,4,4-pentafluoro-2-butene, 1,1,2,3,3-pentafluoro-1-butene, 1,1,2,3,4-pentafluoro-2-butene, 1,2,3,3,4-pentafluoro-1-butene, 1,1,3,3,3-pentafluoro-2-methyl-1-propene, 2-(difluoromethyl)-3,3,3-trifluoro-1-propene, 3,3,4,4-tetrafluoro-1-butene, 1,1,3,3-tetrafluoro-2-methyl-1-propene, 1,3,3,3-tetrafluoro-2-methyl-1-propene, 2-(difluoromethyl)-3,3-difluoro-1-propene, 1,1,1,2-tetrafluoro-2-butene, 1,1,1,3-tetrafluoro-2-butene, 1,1,1,2,3,4,4,5,5,5-decafluoro-2-pentene, 1,1,2,3,3,4,4,5,5,5-decafluoro-1-pentene, 1,1,1,4,4,4-hexafluoro-2-(trifluoromethyl)-2-butene, 1,1,1,2,4,4,5,5,5-nonafluoro-2-pentene, 1,1,1,3,4,4,5,5,5-nonafluoro-2-pentene, 1,2,3,3,4,4,5,5,5-nonafluoro-1-pentene, 1,1,3,3,4,4,5,5,5-nonafluoro-1-pentene, 1,1,2,3,3,4,4,5,5-nonafluoro-1-pentene, 1,1,2,3,4,4,5,5,5-nonafluoro-2-pentene, 1,1,1,12,3,4,4,5,5-nonafluoro-2-pentene, 1,1,1,2,3,4,5,5,5-nonafluoro-2-pentene, 1,2,3,4,4,4-hexafluoro-3-(trifluoromethyl)-1-butene, 1,1,2,4,4,4-hexafluoro-3-(trifluoromethyl)-1-butene, 1,1,1,4,4,4-hexafluoro-3-(trifluoromethyl)-2-butene, 1,1,3,4,4,4-hexafluoro-3-(trifluoromethyl)-1-butene, 2,3,3,4,4,5,5,5-octafluoro-1-pentene, 1,2,3,3,4,4,5,5-octafluoro-1-pentene, 3,3,4,4,4-pentafluoro-2-(trifluoromethyl)-1-butene, 1,1,4,4,4-pentafluoro-3-(trifluoromethyl)-1-butene, 1,3,4,4,4-pentafluoro-3-(trifluoromethyl)-1-butene, 1,1,4,4,4-pentafluoro-2-(trifluoromethyl)-1-butene, 1,1,1,4,4,5,5,5-octafluoro-2-pentene, 3,4,4,4-tetrafluoro-3-(trifluoromethyl)-1-butene, 3,3,4,4,5,5,5-heptafluoro-1-pentene, 2,3,3,4,4,5,5-heptafluoro-1-pentene, 1,1,3,3,5,5,5-heptafluoro-1-pentene, 1,1,1,2,4,4,4-heptafluoro-3-methyl-2-butene, 2,4,4,4-tetrafluoro-3-(trifluoromethyl)-1-butene, 1,4,4,4-tetrafluoro-3-(trifluoromethyl)-1-butene, 1,4,4,4-tetrafluoro-3-(trifluoromethyl)-2-butene, 2,4,4,4-tetrafluoro-3-(trifluoromethyl)-2-butene, 3-(trifluoromethyl)-4,4,4-trifluoro-2-butene, 3,4,4,5,5,5-hexafluoro-2-pentene, 1,1,1,4,4,4-hexafluoro-2-methyl-2-butene, 3,3,4,5,5,5-hexafluoro-1-pentene, 4,4,4-trifluoro-2-(trifluoromethyl)-1-butene, 1,1,2,3,3,4,4,5,5,6,6,6-dodecafluoro-1-hexene, 1,1,1,2,2,3,4,5,5,6,6,6-dodecafluoro-3-hexene, 1,1,1,4,4,4-hexafluoro-2,3-bis (trifluoromethyl)-2-butene, 1,1,1,4,4,5,5,5-octafluoro-2-trifluoromethyl-2-pentene, 1,1,1,3,4,5,5,5-octafluoro-4-(trifluoromethyl)-2-pentene, 1,1,1,4,5,5,5-heptafluoro-4-(trifluoromethyl)-2-pentene, 1,1,1,4,4,5,5,6,6,6-decafluoro-2-hexene, 1,1,1,2,2,5,5,6,6,6-decafluoro-3-hexene, 3,3,4,4,5,5,6,6,6-nonafluoro-1-hexene, 4,4,4-trifluoro-3,3-bis (trifluoromethyl)-1-butene, 1,1,1,4,4,4-hexafluoro-3-methyl-2-(trifluoromethyl)-2-butene, 2,3,3,5,5,5- hexafluoro-4-(trifluoromethyl)-1-pentene, 1,1,1,2,4,4,5,5,5-nonafluoro-3-methyl-2-pentene, 1,1,1,5,5,5-hexafluoro-4-(trifluoromethyl)-2-pentene, 3,4,4,5,5,6,6,6-octafluoro-2-hexene, 3,3,4,4,5,5,6,6-octafluoro-2-hexene, 1,1,1,4,4-pentafluoro-2-(trifluoromethyl)-2-pentene, 4,4,5,5,5-pentafluoro-2-(trifluoromethyl)-1-pentene, 3,3,4,4,5,5,5-heptafluoro-2-methyl-1-pentene, 1,1,1,2,3,4,4,5,5,6,6,7,7,7-tetradecafluoro-2-heptene, 1,1,1,2,2,3,4,5,5,6,6,7,7,7-tetradecafluoro-2-heptene, 1,1,1,3,4,4,5,5,6,6,7,7,7-tridecafluoro-2-heptene, 1,1,1,2,4,4,5,5,6,6,7,7,7-tridecafluoro-2-heptene, 1,1,1,2,2,4,5,5,6,6,7,7,7-tridecafluoro-3-heptene, 1,1,1,2,2,3,5,5,6,6,7,7,7-tridecafluoro-3-heptene, 4,4,5,5,6,6,6-heptafluoro-2-hexene, 4,4,5,5,6,6,6-heptafluoro-1-hexene, 1,1,1,2,2,3,4-heptafluoro-3-hexene, 4,5,5,5-tetrafluoro-4-(trifluoromethyl)-1-pentene, 1,1,1,2,5,5,5-heptafluoro-4-methyl-2-pentene, 1,1,1,3-tetrafluoro-2-(trifluoromethyl)-2-pentene, 1,2,3,3,4,4-hexafluorocyclobutene, 3,3,4,4-tetrafluorocyclobutene, 3,3,4,4,5,5-hexafluorocyclopentene, 1,2,3,3,4,4,5,5-octafluorocyclopentene, 1,2,3,3,4,4,5,5,6,6-decafluorocyclohexene, 1,1,1,2,3,4,5,5,5-nonafluoro-4-(trifluoromethyl)-2-pentene, pentafluoroethyl trifluorovinyl ether, trifluoromethyl trifluorovinyl ether; or any combination thereof. For example, the refrigerant may include, consist essentially of, or consist entirely of one or more tetrafluoropropenes, one or more pentafluoropropenes, one or more trifluoropropenes, one or more hexafluorobutenes, one or more pentafluorobutenes, one or more octafluobutenes, one or more heptafluorobutenes, one or more tetrafluorobutenes, or any combination thereof.

Minor et al. (US Patent Application Publication No. 2007/0289317, hereby incorporated by reference) further lists examples of saturated and unsaturated fluorocarbon refrigerants which may be used as the fluoroalkane in the present invention. As set forth in paragragph 81 of Minor et al., representative hydrofluorocarbons may be represented by the formula $C_xH_{2x+2-y}F_y$ or $C_xH_{2x-y}F_y$, where, x may equal 3 through 8 and y may equal 1 through 17. The hydrofluorocarbons may be straight chain, branched chain or cyclic; saturated or unsaturated compounds having from about 3 to 8 carbon atoms. Without limitation, exemplary fluoroalkanes which may be used, as set forth in Minor et al. paragraphs 47-78, include: 1,1,2,2,3-pentafluoropropane; 1,1,1,3,3-pentafluoropropane; 1,1,3-trifluoropropane; 1,1,3-trifluoropropane; 1,3-difluoropropane; 2-(difluoromethyl)-1,1,1,2,3,3-hexafluoropropane; 1,1,2,2,3,3,4,4-octafluorobutane; 1,1,1,2,2,4-hexafluorobutane; 1,1,1,3,3-pentafluorobutane; 1,1-difluorobutane; 1,3-difluoro-2-methylpropane; 1,2-difluoro-2-methylpropane; 1,2-difluorobutane; 1,3-difluorobutane; 1,4-difluorobutane; 2,3-difluorobutane; 1,1,1,2,3,3,4,4-octafluoro-2-(trifluoromethyl)butane; 1,1,1,2,2,3,3,4,4,5,5-undecafluoropentane; 1,1,1,2,2,3,4,5,5,5-decafluoropentane; 1,1,1,2,2,3,3,5,5,5-decafluoropentane; 1,1,1,4,4,4-hexafluoro-2-(trifluoromethyl)butane; 1,1,1-trifluoropentane; 1,1,1-trifluoro-3-methylbutane; 1,1-difluoropentane; 1,2-difluoropentane; 2,2-difluoropentane; 1,1,1-trifluorohexane; 1,1,1,2,2,3,3,4,4,5,5,6,6-tridecafluorohexane; 1,1,1,2,2,5,5,5-octafluoro-4-(trifluoromethyl)pentane; 1,1,2,2-tetrafluorocyclobutane; 3,3,4,4,5,5,6,6-nonafluoro-1-hexene; and combinations thereof.

The refrigerant preferably has a low GWP, less than about 150, preferably less than about 100, more preferably less than about 10, and most preferably less than about 6. The refrigerant preferably has a minimum ignition energy (MIE) of at least 200 mJ as measured by ASTM E-582. The lower flammability limit at 21° C. of the fluoroolefin may be at least about 5 volume % as measured by ASTM E-681.

The refrigerant may include one or a combination of the above individual refrigerants.

The refrigerant composition includes any lubricant which may reduce the wear of the working parts of the refrigerant system. The lubricant preferably has sufficient solubility in the refrigerant to ensure that the lubricant can return to the compressor from the evaporator. Furthermore, the lubricant preferably has a relatively low viscosity at low temperatures so that the lubricant is able to pass through the cold evaporator. In one preferred embodiment, the refrigerant and the lubricant are miscible over a broad range of temperatures.

Preferred lubricants may be one or more polar, oxygenated compounds. Preferred polar, oxygenated compounds include polyalkylene oxides also known as polyalkylene glycols (PAGs), and polyol esters (POEs).

Polyalkylene glycols as used herein include compounds containing more than one alkylene oxide wherein one or more of the ends are opened with a moiety (group) that does not contain an active hydrogen atom. Any alkylene oxide which facilitates lubrication can be used with ethylene oxide and propylene oxide being preferred and propylene oxide more preferred. End capping moieties include any moiety which does not interfere with lubrication or refrigeration. Preferred end capping moieties include lower alkyl groups; with $C_{1-4}$ lower alkyl groups more preferred. Preferred PAG lubricants include one or any combination of alkyl ether capped compounds, ester capped compounds or monols that have at least a single hydroxyl group. Preferred alkylene glycols are single end capped or double end capped. Preferred alkyl ether capped compounds include methyl ether, ethyl ether, propyl ether, and butyl ether capped compounds. Diols and triols may also be suitable.

Exemplary polyalkylene glycols (e.g., first polyalkylene glycols) include polyalkylene glycol monols, polyalkylene glycol diols, and polyalkylene triols, such as methanol initiated polyalkylene glycol and butanaol initiated polyalkylene glycol. The polyalkylene glycol may be a homopolymer (e.g. polyethylene glycol or polypropylene glycol) or a copolymer. Preferred homopolymers are polymers of propylene oxide (PO) prepared from propylene oxide initiated with mono and polyhydric alcohols, with preferred alcohol initiators including methanol, butanol and glycerine. Polyalkylene glycol copolymers may be random copolymers or block copolymers. Blends of two or more polyalkylene glycols may also be used. For examples, the lubricant may include a blend of a polyalkylene glycol homopolymer (e.g. a methanol or butanol initiated polypropylene glycol) and a polyalkylene glycol copolymer (e.g. a random copolymer of ethylene oxide and propylene oxide, which may be a monol or a diol). As another example, the lubricant may be a blend of two or more polyalkylene glycols such as a blend of polyethylene glycol and polypropylene glycol, or a blend of two different polypropylene glycols.

In one aspect of the invention, the lubricant includes or consists essentially of a propylene oxide homopolymer or a polyethylene oxide homopolymer according to Formula I:

$$Z-[-(CH_2-CH(R^1)-O-)_n-R^2]_p \quad \text{(Formula I)}$$

where p is an integer ranging from 1 to about 8, the average value of n ranges from about 15 to about 100, $R^1$ is H or $CH_3$, $R^2$ is H or an alkyl group of 1 to 6 carbon atoms, and Z is the residue of a compound having p active hydrogens. In this aspect of the invention the first polyalkylene glycol may also include (in addition to the propylene oxide homopolymer according to Formula I) a monol initiated polyethylene oxide, a monol initiated random copolymer of propylene oxide and ethylene oxide, or a combination.

The POE lubricants are esters of fatty acids with polyhydric alcohols, e.g. diols, triols and polyols, and/or polyhydric polyethers. The fatty acids include straight and branched fatty acids having from 2-20 carbon atoms and also polyacidic (e.g. diacid) fatty acids having from 4 to 36 carbon atoms. The polyol ester lubricants may be derived by esterifying, with one or more fatty acids, a polyhydric alcohol or a polyhydric polyether.

The lubricants may be selected to have a viscosity of between about 10 and about 460 cSt at 40° C., preferably between about 22 and about 220 cSt at 40° C. and most preferably between about 40 and about 150 cSt at 40° C.

Other possible lubricants include an alkylbenzene and a polyvinyl ether. For example, the lubricant may be a polyalkylene oxide, a polyol ester, an alkylbenzene, or any combination thereof.

In another aspect of this invention, the solubility of the lubricant in the refrigerant is temperature dependent because the temperature within the compressor is usually significantly higher than the temperature within the evaporator. Preferably, in the compressor, the lubricant and the refrigerant are separate from each other and not soluble; the lubricant is a liquid and the refrigerant is a gas being compressed. On the contrary, in the evaporator, preferably the lubricant and the refrigerant are mutually soluble. One particularly preferred situation is one that leads to minimal decreases in viscosity of the lubricant in the compressor due to minimal dilution by the refrigerant. This in turn leads to better lubricity and decreased lubricant discharge from the compressor. At the same time, the low temperature solubility helps ensure that any lubricant that is discharged from the compressor is returned. Thus, in one embodiment, a lubricant that exhibits low temperature solubility and high temperature insolubility is desirable. In a preferred embodiment, the lubricant is soluble in the refrigerant at temperatures between about −40° C. and about 100° C., and more preferably in the range of about −40° C. and about 40° C. In another embodiment, attempting to maintain the lubricant in the compressor is not a priority and thus high temperature insolubility is not preferred. In this embodiment, the lubricant is soluble at temperatures above about 80° C., more preferably at temperatures above about 90° C., and most preferably at temperatures above about 100° C.

The lubricant may have a kinematic viscosity (measured at 40° C., according to ASTM D445-06) greater than about 5 cSt, preferably greater than about 10 cSt, and most preferably greater than 20 cSt. The lubricant may have a kinematic viscosity (measured at 40° C., according to ASTM D445-06) of less than about 600 cSt, more preferably less than about 320 cSt, and most preferably, less than about 210 cSt. The lubricant preferably has a molecular weight (as measured by Gel Permeation Chromatography (GPC) or Time of Flight Mass Spectrometry (TOF-MS) between about 1000 and 4000, more preferably between about 1500 and 3500. Lubricants with molecular weights in these ranges provide Falex wear testing results that are more favorable compared to lubricants with molecular weights outside of these ranges.

The portions of the refrigerant and lubricant in the composition are determined so that there is sufficient lubricant to lubricate the compressor. Typically, the lubricant makes up greater than about 1 percent by weight ("wt %"), preferably greater than 2 wt %, and more preferably greater than 5 wt % of the total refrigerant composition at the time the composition is charged into a system. The lubricant may be less than about 50 wt %, preferably less than 30 wt % and more preferably less than about 20 wt % of the total refrigerant composition at the time the composition is charged into a system. The wt % of the lubricant will typically affect the mutual solubility of the refrigerant and lubricant and thus the available operating temperatures for the refrigeration device. Typically, the refrigerant makes up greater than about 50 percent by weight ("wt %"), preferably greater than 70 wt % and more preferably greater than 80 wt % of the total refrigerant composition at the time the composition is charged into a system. The refrigerant may be less than about 99 wt %, preferably less than 98 wt % and more preferably less than about 95 wt % of the total refrigerant composition at the time the composition is charged into a system.

As described above, the refrigerant composition further comprises a stabilizer which may function as an acid scavenger. Suitable stabilizers includes a siloxane, an activated aromatic compound, or a combination.

The siloxane may be any molecule having a siloxy functionality. The siloxane may include an alkyl siloxane, an aryl siloxane, or a siloxane containing mixtures of aryl and alkyl substituents. For example the siloxane may be an alkylsiloxane, including a dialkylsiloxane or a polydialkylsiloxane. Preferred siloxanes include an oxygen atom bonded to two silicon atoms, i.e., a group having the structure: Si—O—Si. For example, the siloxane may be a siloxane of Formula IV: $R^1—[—Si(R^2R^3)—O—]_n—Si(R^2R^3)—R^4$, where n is 1 or more. Siloxanes of Formula IV have n that is preferably 2 or more, more preferably 3 or more, (e.g., about 4 or more). Siloxanes of formula IV have n that is preferably about 30 or less, more preferably about 12 or less, and most preferably about 7 or less. Preferably the $R^4$ group is an aryl group or an alkyl group. Preferably the $R^2$ groups are aryl groups or alkyl groups or mixtures thereof. Preferably the $R^3$ groups are aryl groups or alkyl groups or mixtures thereof. Preferably the $R^4$ group is an aryl group or an alkyl group. Preferably $R^1$, $R^2$, $R^3$, $R^4$, or any combination thereof are not hydrogen. The $R^2$ groups in a molecule may be the same or different. Preferably the $R^2$ groups in a molecule are the same. The $R^2$ groups in a molecule may be the same or different from the $R^3$ groups. Preferably, the $R^2$ groups and $R^3$ groups in a molecule are the same. Preferred siloxanes include siloxanes of Formula IV, wherein $R^1$, $R^2$, $R^3$, $R^4$, $R^5$, or any combination thereof is a methyl, ethyl, propyl, or butyl group, or any combination thereof. Exemplary siloxanes that may be used include hexamethyldisiloxane, polydimethylsiloxane, polymethylphenylsiloxane, dodecamethylpentasiloxane, decamethylcyclopentasiloxane, decamethyltetrasiloxane, octamethyltrisiloxane, or any combination thereof.

In one aspect of the invention, the siloxane is an alkylsiloxane containing from about 1 to about 12 carbon atoms, such as hexamethyldisiloxane. The siloxane may also be a polymer such as polydialkylsiloxane, where the alkyl group is a methyl, ethyl, propyl, butyl, or any combination thereof. Suitable polydialkylsiloxanes have a molecular weight from about 100 to about 10,000. Highly preferred siloxanes include hexamethyldisiloxane, polydimethylsiloxane, and combinations thereof. The siloxane may consist essentially of polydimethylsiloxane, hexamethyldisoloxane, or a combination thereof.

In one embodiment, preferable siloxanes also include siloxane capped polyalkylene glycols, such as an adduct of a second polyalkylene glycol and a siloxane.

The siloxyl containing stabilizer may be an adduct which is a reaction product of a second polyalkylene glycol and either a siloxane or a silylchloride such that the adduct comprises at least one siloxy group. The second polyalkylene glycol may be any art known polyalkylene glycol, including those described for the first polyalkylene glycol which may be used in the lubricant. One example of a siloxyl containing adduct is the reaction product of a second polyalkylene glycol and a silylchloride. The silylchloride may be characterized as having a structure given by Formula II:

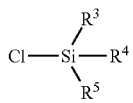

(Formula II)

where $R^3$, $R^4$, $R^5$ are alkyl, aromatic, allylic, or hydrogen (preferably $R^3$, $R^4$, $R^5$ are alkyl, aromatic, or allylic). The silylchloride may have the structure of Formula II where $R^3$, $R^4$, $R^5$ are alkyl, or hydrogen and each contain from about 0 to about 4 carbon atoms (preferably from 1 to 4 carbon atoms). Exemplary silylchlorides include trialkylsilylchlorides (for example, trimethylsilylchloride).

The acid scavenger preferably is not a fluoralkyl polysiloxane, such as the anti-load additive described by Kawaguchi et al. (U.S. Pat. No. 6,475,405 issued Nov. 5, 2002), column 8, line 63 to column 9 line 18. As such, suitable acid scavenger may be free of fluorine atoms, free of Si—O—Si groups, or both.

The siloxyl containing stabilizer may also be an adduct having the structure given by Formula III:

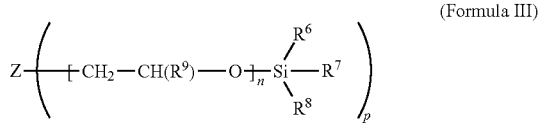

(Formula III)

where p is an integer ranging from about 1 to about 8, the average value of n ranges from about 15 to about 100, $R^9$ is H or $CH_3$, $R^6$, $R^7$, $R^8$ may each be an alkyl group containing from about 1 to about 100 carbon atoms, an aryl group containing from about 1 to about 100 carbon atoms, or any combination thereof, and Z is the residue of a compound having p active hydrogens.

The activated aromatic compound may be any aromatic molecule activated towards a Friedel-Crafts addition reaction, or mixtures thereof. An aromatic molecule activated towards a Friedel-Crafts addition reaction is defined to be any aromatic molecule capable of an addition reaction with mineral acids. Especially aromatic molecules capable of addition reactions with mineral acids either in the application environment (AC system) or during the ASHRAE Standard 97-199 thermal stability test. Such molecules or compounds are typically activated by substitution of a hydrogen atoms of the aromatic ring with one of the following groups: $-NH_2$, $-NHR$, $-NR_2$, $-OH$, $-O-$, $-NHCOCH_3$, $-NHCO_R$, $-OCH_3$, $-OR$, $-CH_3$, $-C_2H_5$, $-R$, or $-C_6H_5$, where R is a hydrocarbon (preferably a hydrocarbon containing from about 1 to about 100 carbon atoms). The activated aromatic molecule may be an alcohol, or an ether, where the oxygen atom (i.e., the oxygen atom of the alcohol or ether group) is bonded directly to an aromatic group. The activated aromatic molecule may be an amine where the nitrogen atom (i.e., the nitrogen atom of the amine group) is bonded directly to an aromatic group. By way of example, the activated aromatic molecule may have the formula $Ar-X-R_n$, where X is O (i.e., oxygen) or N (i.e., nitrogen); n=1 when X=O; n=2 when x=N; Ar is an aromatic group (i.e., group, $-C_6H_5$); R may be H or a carbon containing group; and when n=2, the R groups may be the same or different. For example, R may be H (i.e., hydrogen), Ar, an alkyl group, or any combination thereof, Exemplary activated aromatic molecules that may be employed in a refrigerant composition according to the teachings herein include diphenyl oxide (i.e., diphenyl ether), methyl phenyl ether (e.g., anisole), ethyl phenyl ether, butyl phenyl ether or any combination thereof. One highly preferred aromatic molecule activated towards a Friedel-Crafts addition reaction is diphenyl oxide.

The acid scavenger (e.g., the activated aromatic compound, the siloxane, or both) may be present in any concentration that results in a relatively low total acid number, a relatively low total halides concentration, a relatively low total organic acid concentration, or any combination thereof. Preferably the acid scavenger is present at a concentration greater than about 0.0050 wt %, more preferably greater than about 0.05 wt % and even more preferably greater than about 0.1 wt % (e.g. greater than about 0.5 wt %) based on the total weight of the refrigerant composition. The acid scavenger preferably is present in a concentration less than about 3 wt %, more preferably less than about 2.5 wt % and most preferably greater than about 2 wt % (e.g. less than about 1.8 wt %) based on the total weight of the refrigerant composition.

Additional examples of acid scavengers which may be included in the refrigerant composition and preferably are excluded from the refrigerant composition include those described by Kaneko (U.S. patent application Ser. No. 11/575,256, published as 20070290164, paragraph 42, expressly incorporated herein by reference), such as one or more of: phenyl glycidyl ethers, alkyl glycidyl ethers, alkyleneglycolglycidylethers, cyclohexeneoxides, α-olefinoxides, or epoxy compounds such as epoxidized soybean oil, and those described by Singh et al. (U.S. patent application Ser. No. 11/250,219, published as 20060116310, paragraphs 34-42, expressly incorporated herein by reference).

The kinematic viscosity (measured at 40° C., according to ASTM D445-06) of the refrigerant composition may be greater than about 3 cSt, preferably greater than about 5 cSt, and most preferably greater than 10 cSt. The refrigerant composition may have a kinematic viscosity (measured at 40° C., according to ASTM D445-06) of less than about 400 cSt, more preferably less than about 220 cSt, and most preferably, less than about 160 cSt.

The overall resulting refrigerant composition may exhibit a relatively low total acid number, preferably less than about 3.3 mg KOH/g (more preferably less than about 2 mg KOH/g) after aging per ANSI ASHRAE 97 for 14 days at 175° C. with aluminum, copper and iron metal strips, as measured by ASTM D664-01. Thus measured, the total acid number after aging of the refrigerant composition including the acid scavenger is preferably less than, more preferably at least 20% less than, even more preferably at least 40% less than, and most preferably at least 60% less than the total acid number after aging of a refrigerant composition having the same composition except that it is free of the acid scavenger.

The overall resulting refrigerant composition may exhibit a relatively low total halides concentration (or more specifically, a relatively low fluorine ion concentration) of less than about 240 ppm, preferably less than about 40 ppm, more preferably less than about 10 ppm, and most preferably less than about 5 ppm after aging per ANSI ASHRAE 97 for 14 days at 175° C. with aluminum, copper and iron metal strips, as measured by ion chromatography. The refrigerant composition may exhibit a relatively low total organic acid concentration of less than about 600 ppm, preferably less than about 200 ppm, and more preferably less than about 100 ppm after aging per ANSI ASHRAE 97 for 14 days at 175° C. with aluminum, copper and iron metal strips, as measured by ion chromatography.

The overall resulting refrigerant compositions of the present invention may also include an additive or an additives package with one or any combination of the following: an extreme pressure additive, an anti-wear additive, an antioxidant, a high-temperature stabilizer, a lubricity additive, a viscosity index improver, a metal deactivator, a corrosion inhibitor, a detergent, a dispersant or an anti-foaming agent. Extreme pressure additives improve the lubricity and load bearing characteristics of the refrigerant composition. Preferred additives include those described in U.S. Pat. Nos. 5,152,926; 4,755,316, which are hereby incorporated by reference. In particular, the preferred extreme pressure additives include mixtures of (A) tolyltriazole or substituted derivatives thereof, (B) an amine (e.g. Jeffamine M-600) and (C) a third component which is (i) an ethoxylated phosphate ester (e.g. Antara LP-700 type), or (ii) a phosphate alcohol (e.g. ZELEC 3337 type), or (iii) a zinc dialkyldithiophosphate (e.g. Lubrizol 5139, 5604, 5178, or 5186 type), or (iv) a mercaptobenzothiazole, or (v) a 2,5-dimercapto-1,3,4-triadiazole derivative (e.g. Curvan 826) or a mixture thereof. Additional examples of additives which may be used are given in U.S. Pat. No. 5,976,399 (Schnur, 5:12-6:51, hereby incorporated by reference).

The refrigerant composition may be supplied as a kit. For example, the refrigerant composition may be supplied as a kit comprising a refrigerant component (which may contain most or all of the refrigerant) and a lubricant component (which may contain most or all of the lubricant), with each additive added to the refrigerant component, the lubricant component or both. In one example, all of the additives are added to either the refrigerant component or the lubricant component. For example, essentially all of the additives may be in the lubricant component and the refrigerant component may consist essentially of the refrigerant.

Another aspect of the invention is the process of charging a refrigeration device comprising a step of providing a refrigerant composition, as described in this invention, comprising a refrigerant, a lubricant, and a siloxane, and further comprising a step of charging the device with the refrigerant so that it can be used for cooling.

Acid number is measured according to ASTM D664-01 in units of mg KOH/g. The total halides concentration, the fluorine ion concentration, and the total organic acid concentration is measured by ion chromatography. Chemical stability of the refrigerant system is measured according to American Society of Heating Refrigerating and Air-Conditioning Engineers (ASHRAE) Standard 97-199 (RA 2003). The viscosity of the lubricant is tested according to at 40° C. according to ASTM D-7042.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A refrigerant composition for use in air conditioners comprising:
   i) a refrigerant, wherein the refrigerant comprises a fluorocarbon which is present at a concentration of at least about 50% by weight of the refrigerant composition;

ii) a lubricant which reduces the wear of one or more working parts in a refrigerant system, wherein the lubricant includes one or more polyalkylene glycols; and iii) an acid scavenger including diphenyl oxide;

wherein the refrigerant composition functions as a heat transfer fluid in a cycle including a phase change from a liquid to a gas.

2. The refrigerant composition of claim 1 wherein the diphenyl oxide is capable of addition reactions with mineral acids during the ASHRAE Standard 97-199 thermal stability test.

3. The refrigerant composition of claim 2 wherein the acid scavenger is diphenyl oxide.

4. The refrigerant composition of claim 1, wherein the acid scavenger is present at a concentration from about 0.1 wt. % to about 3 wt. % based on the total weight of the refrigerant composition.

5. The refrigerant composition of claim 1 wherein i) the refrigerant composition has one liquid phase after aging per ANSI ASHRAE 97 for 14 days at 175° C. with aluminum, copper and iron metal strips;

ii) the refrigerant composition has a total acid number of less than about 3.3 mg KOH/g after aging per ANSI ASHRAE 97 for 14 days at 175° C. with aluminum, copper and iron metal strips; or iii) both i) and ii); and wherein the fluorocarbon includes a hydrofluorocarbon, and the lubricant and the hydrofluorocarbon are miscible from about 0° C. to about 40° C.

6. The refrigerant composition of claim 1, wherein the fluorocarbon includes a hydrofluorocarbon containing from 3 to about 12 carbon atoms and at least about 3 fluorine atoms per molecule, and the hydrofluorocarbon has a global warming potential of less than about 10.

7. The refrigerant composition of claim 1, wherein the lubricant includes a first polyalkylene glycol wherein the first polyalkylene glycol comprises a first polyalkylene glycol monol, a polyalkylene diol or any combinations thereof.

8. The refrigerant composition of claim 7, wherein the first polyalkylene glycol includes a propylene oxide homopolymer or a polyethylene oxide homopolymer according to Formula I:

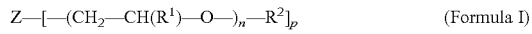

$$Z-[-(CH_2-CH(R^1)-O-)_n-R^2]_p \qquad \text{(Formula I)}$$

wherein p is an integer ranging from 1 to about 8, n has an average value from about 15 to about 100, $R^1$ is H or $CH_3$, $R^2$ is H or an alkyl group of 1 to 6 carbon atoms, and Z is the residue of a compound having p active hydrogens, or the first polyalkylene glycol includes a random copolymer of propylene oxide and ethylene oxide.

9. A kit for a refrigerant composition of claim 1 comprising:

i) a refrigerant component comprising a hydrofluorocarbon, having a global warming potential of less than about 10 and an ozone depletion potential of about zero; and ii) a lubricant component comprising a lubricant for reducing the wear of one or more working parts in a refrigerant system;

wherein the kit further comprises an acid scavenger including diphenyl oxide;

wherein the refrigerant component includes the acid scavenger, the lubricant component includes the acid scavenger, the kit includes an acid scavenger component that includes the acid scavenger, or any combination thereof.

* * * * *